United States Patent [19]
Torii et al.

[11] Patent Number: 4,827,782
[45] Date of Patent: May 9, 1989

[54] INDUSTRIAL ROBOT BRAKE APPARATUS

[75] Inventors: Nobutoshi Torii, Hachioji; Ryo Nihei, Musashino, both of Japan

[73] Assignee: Fanuc Ltd., Minamitsuru, Japan

[21] Appl. No.: 50,303

[22] PCT Filed: Sep. 10, 1986

[86] PCT No.: PCT/JP86/00461
§ 371 Date: Jun. 11, 1987
§ 102(e) Date: Jun. 11, 1987

[87] PCT Pub. No.: WO87/01326
PCT Pub. Date: Mar. 12, 1987

[30] Foreign Application Priority Data
Sep. 10, 1985 [JP] Japan .................. 60-200223

[51] Int. Cl.4 ............... B25J 18/00; F16H 25/20; F16D 65/18
[52] U.S. Cl. .............. 74/89.15; 74/411.5; 74/424.8 R; 188/161; 901/15; 901/21
[58] Field of Search ......... 74/411.5, 89.15, 424.8 R; 403/112, 166, 359; 901/15, 21; 188/161

[56] References Cited
U.S. PATENT DOCUMENTS

| 2,977,777 | 4/1961 | Bernitz | 403/166 |
| 3,543,598 | 12/1970 | Lanzenberger | 74/411.5 |
| 3,549,182 | 12/1970 | Bogue et al. | 403/112 |
| 3,559,499 | 2/1971 | Profet | 74/411.5 |
| 4,149,430 | 4/1979 | F'Geppert | 74/411.5 |
| 4,466,769 | 8/1984 | Inaba et al. | 74/89.15 |
| 4,466,770 | 8/1984 | Peroutky | 414/751 |
| 4,588,057 | 5/1986 | Weich et al. | 74/411.5 |

FOREIGN PATENT DOCUMENTS 51-53586 12/1976 Japan .
60-135107 9/1985 Japan .

Primary Examiner—Allan D. Herrmann
Attorney, Agent, or Firm—Staas & Halsey

[57] ABSTRACT

An industrial robot brake apparatus for braking a mechanism that drives a support shaft supporting an arm in a freely extendable manner is capable of forming a clearance between a fixed brake member, which is for stopping rotation of a screw rod that extends and retracts the support shaft, thereby positioning the working plane of the arm, and a movable brake, thereby facilitating replacement of a belt and inspection of the brake mechanism, such as a brake shoe.

7 Claims, 3 Drawing Sheets

INDUSTRIAL ROBOT BRAKE APPARATUS

DESCRIPTION

CROSS-REFERENCE TO REATED APPLICATIONS

The subject matter of the present invention is related to that of U.S. Application Ser. No. 050,302, filed June 11, 1987.

TECHNICAL FIELD

This invention relates to an industrial robot brake apparatus for braking a mechanism that drives a support shaft supporting an arm in a freely extendable manner.

BACKGROUND ART

A variety of industrial robots have recently come into wide use in various fields. FIG. 3 is a side view illustrating one example of a horizontal articulated industrial robot installed on a floor and provided with a swiveling post.

In FIG. 3, numeral 1 denotes the post supported on a base 2 and capable of being swiveled within a predetermined rotational range ($\theta$). Provided within the base 2 is a swiveling mechanism 21 for swiveling the post 1. Numeral 3 denotes a first arm (working arm) supported at the upper portion of the post 1 by a support shaft 4. A second arm 5 capable of being swiveled in the horizontal direction is attached to the distal end of the first arm 3, and the distal end of the second arm 5 is provided with a wrist 51.

Provided in the post 1 is a drive mechanism 6 for moving the support shaft 4 up and down within a predetermined range (Z) to control the height of the first arm 3.

FIG. 4 is a longitudinal sectional view of the post 1, in which numeral 7 denotes a drive motor having a motor pulley 71 for rotating a screw rod 61 of the drive mechanism 6 via the motor pulley 71, a belt 72 and a drive pulley 63, whereby a nut 62 threadedly engaged with the screw rod 61 is moved up and down to raise and lower the support shaft 4 and, hence, position the working plane of the arm. A movable brake element 81 is fixedly secured to the lower end of the screw rod 61. Attached to the bottom 11 of the post 1 is a fixed brake element 82 for braking rotation of the screw rod 61 by attracting the movable brake element 81 through the use of electromagnetism.

In order to prevent the support shaft 4 from being moved out of position by an external force or the like when the drive motor 7 has been stopped to hold the support shaft 4 at a prescribed height, the braking mechanism in the drive mechanism of the aforementioned kind is so adapted that the fixed brake element 82 attracts the movable brake element 81 to brake the rotation of the screw rod 61, thereby positioning the arms 3, 5 in a prescribed working plane.

In the above-described industrial robot, exchanging the belt 72 between the motor pulley 71 of drive motor 7 and the drive pulley 63 involves a difficult operation in terms of mounting the new belt since the movable brake element 81 is fixedly secured to the lower end of the screw rod 61. Inspecting the contact surfaces of the movable brake element 81 and fixed brake element 82 is a troublesome operation since the movable brake element 81 is fixedly secured to the screw rod 61 and the clearance between the two contact surfaces is small.

SUMMARY OF THE INVENTION

The present invention has been devised in view of the foregoing problems of the prior art and its object is to provide an industrial robot brake apparatus in which belt replacement and brake mechanism inspection can be carried out with ease.

In accordance with the present invention, there is provided an industrial robot brake apparatus for positioning a working plane of an arm supported by a support shaft in a freely extendable manner, the apparatus characterized by having a screw rod for driving the support shaft to extend and retract the same, a fixed brake element for halting rotation of the screw rod, a power transfer belt stretched between a motor for rotatively driving the screw rod and a drive pulley on an end portion of the screw rod, and a movable brake element freely slidably splined on the end portion of the screw rod, on the side of the drive pulley engaged by the belt, to provide a clearance between the movable brake element and fixed brake element through which at least the belt can be passed.

With the industrial robot brake apparatus of the present invention, the screw rod and the movable brake element mounted thereon are splined so as to be freely slidable with respect to the fixed brake element. Therefore, when a belt is to be attached or an inspection is to be performed, the movable brake element can be moved upward to widen the spacing between the contact surfaces of the movable and fixed brake elements.

DETAILED DESCRIPTION OF THE PREFERRED EMBODIMENTS

A preferred embodiment of the present invention will now be described with reference to the drawings.

Figure 1:
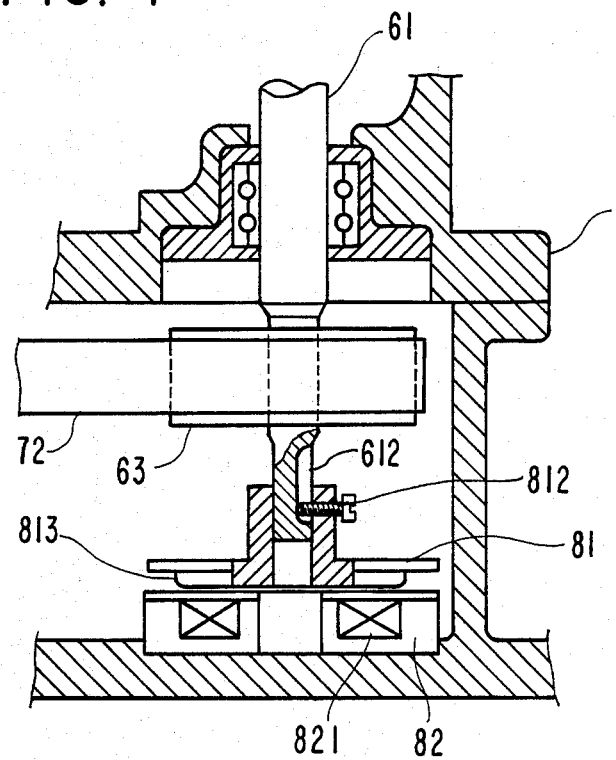
FIG. 1 is a longitudinal sectional view illustrating an embodiment of an industrial robot brake apparatus according to the present invention.
Figure 2:
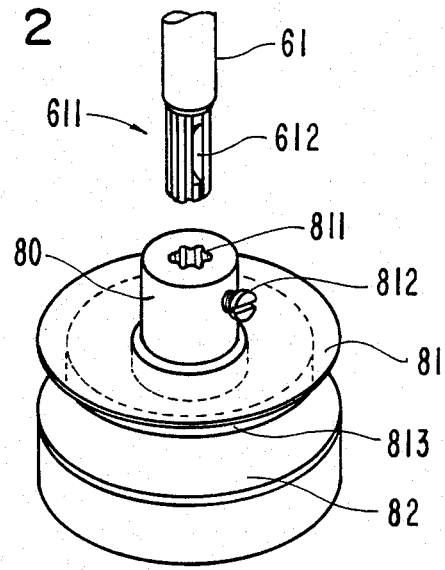
FIG. 2 is a perspective view of a portion of the brake apparatus, of FIG. 1
Figure 3:
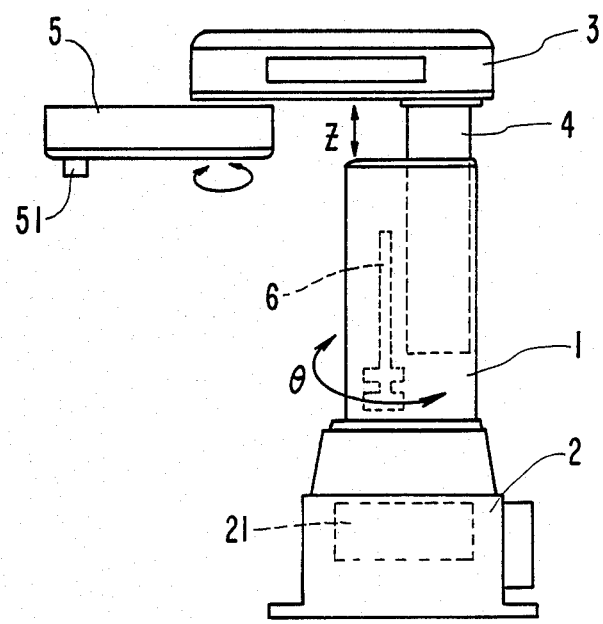
FIG. 3 is a side view illustrating an example of a common horizontal articulated-type industrial robot.
Figure 4:
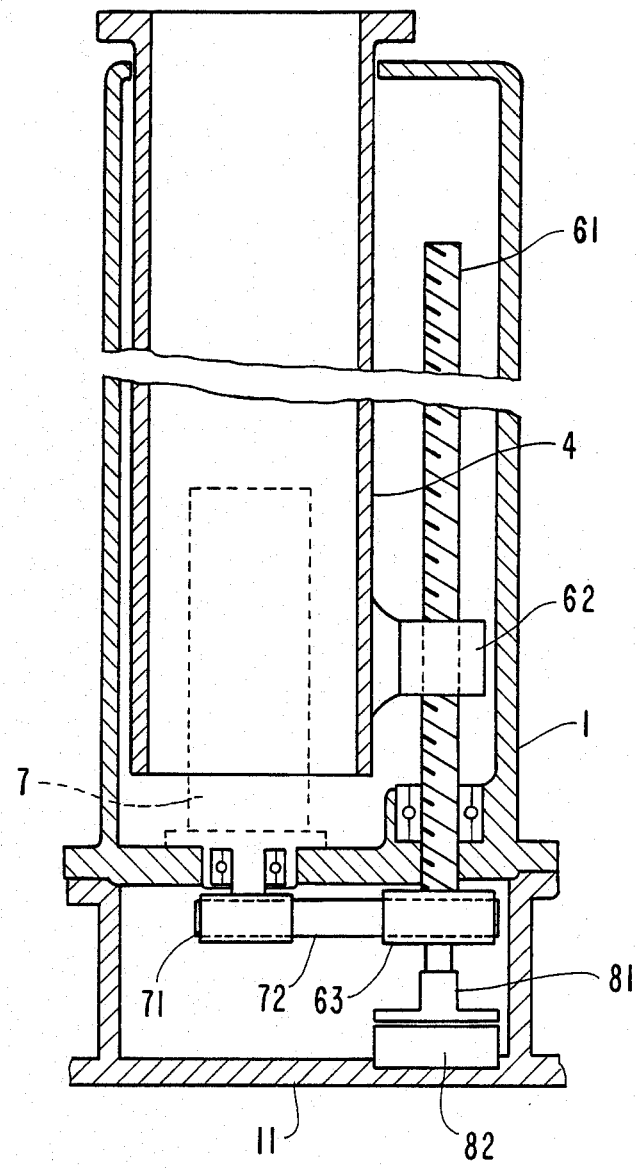
FIG. 4 is a longitudinal sectional view illustrating the structure of a conventional brake apparatus based on a post shown in FIG. 3.

In FIG. 1 and 2 numeral 61 denotes a screw rod rotated by a drive pulley 63 via a belt 72 and having a splined lower end portion 611. A moveable brake element 81 having a hub 80 provided with a splined central bore 811 is engaged with the splined lower end portion 611 and is freely slidably fitted on the splined lower end portion 611 of the screw rod 61. a portion of the splined end portion 611 is provided with an oval-shaped depression 612 extending in the axial direction. The arrangement is such that the movable brake element 81 slidably moves up and down in an axial direction a prescribed distance along the splined end portion 611 of screw rod 61 by means of a set screw 812 provided in the hub 80 of the movable brake element 81. Numeral 82 denotes a fixed brake element incorporating an electromagnetic coil 821. By passing a current through the electromagnetic coil 821, a brake shoe 813 provided on the lower part of the movable brake element 81 is attracted by the electromagnetic action of the electromagnetic coil 821, whereby rotation of the screw rod 61 is stopped. When no current is flowing through the electromagnetic coil 821, the lower surface of the brake shoe 813 is moved to a prescribed position where it will not contact the upper surface of the fixed brake shoe 82. This is done by the elastic force of a spring (not shown), provided on the hub 80 of the movable brake element 81.

The operation of the present embodiment thus constructed will now be described.

When the belt is to be exchanger for another or the lower surface of the brake shoe 813 is to be inspected, current is removed from the drive motor 7 and electromagnetic coil 821 to stop the screw shaft 61 from rotating and eliminate the attractive force of the electromagnetic coil 821, thereby freeing the movable brake element 81 for up-and-down motion. Next, the movable brake element 81 is moved upwardly, whereupon the hub 80 of the movable brake element 81 moves upwardly owing to the slidable slined connection to the screw rod 61. The movable brake element 81 can be moved upwardly until the set screw 812 abuts against the upper end portion of the oval-shaped depression 612 in the splined end portion 611, thereby widening the clearance between the lower surface of the brake shoe 813 and an upper friction surface of the fixed brake element 82.

It is possible to change the belt or to inspect the contact surfaces of the brake shoe 813 and fixed brake element 82 by utilizing the widened clearance.

Thus, in the brake appartus of the invention as described in detail above, the splined end portion is provided at the lower end of the screw rod for driving the support shaft of the working arm up and down, the splined central bore engaged with the splined end portion is provided on the central axis of the movable brake element of the brake mechanism, and the movable brake element is capable of being slid axially up and down. This makes it possible to widen the spacing between the movable brake element and fixed brake element, thereby facilitating belt replacement and inspection of the lower surface of the brake shoe.

Though the present invention has been described based on an embodiment thereof, the invention can be modified in various ways without departing from the scope of the claims.

Thus, in the inventive industrial robot brake apparatus for braking a mechanism that drives a support shaft supporting an arm in freely extendable manner, the spacing between the movable brake element and fixed brake element can be widened to facilitate belt replacement and inspection of the lower surface of the brake shoe.

We claim:

1. An industrial robot brake apparatus for positioning a working place of an arm supported by a support shaft in a freely extendable manner, comprising:
    a screw rod for driving said support shaft to extend and retract the support shaft and having a splined lower end;
    a fixed brake element adjacent the splined lower end of the screw rod for halting rotation of the screw rod;
    a motor for rotating said screw rod through a power transfer belt stretched between the motor and a drive pulley disposed on the screw rod above the splined end portion of the screw rod; and
    a movable brake element having a splined central bore and being slidably supported on the splined end portion of said screw rod and being axially movable relative to said splined end portion and being movable upwardly along the splined end portion a distance sufficient to provide a clearance between the movable brake element and said fixed brake element through which at least said belt can be passed.

2. An industrial robot brake apparatus according to claim 1, wherein the arm of said industrial robot is a horizontal articulated-type arm.

3. An industrial robot brake apparatus according to claim 1, wherein the splined end portion of the screw rod includes an axial depression for cooperating with limiting means for limiting the axial movement of the movable brake element along the splined end portion of the screw rod.

4. An industrial robot brake apparatus according to claim 3, wherein the movable brake element includes a hub having proximal and distal ends and a brake shoe disposed at the distal end of the hub.

5. An industrial robot brake apparatus according to claim 4, wherein the brake shoe has a braking surface and the fixed brake element has an upper friction surface, and wherein the movable brake element is movable in an axial direction into engagement with the fixed brake element by electromagnetic means.

6. An industrial robot brake apparatus according to claim 4, wherein the means for limiting axial movement of the movable brake element includes a set screw extending transversely through a proximal end of the movable brake element hub into the axial depression of the splined end portion of the screw rod.

7. An industrial robot brake apparatus according to claim 4, wherein the limiting means comprises a set screw passing through the hub of the movable brake element and protruding into the axial depression of the splined end portion of the screw rod.

* * * * *